United States Patent
Koo et al.

(10) Patent No.: US 8,484,681 B2
(45) Date of Patent: Jul. 9, 2013

(54) IMAGE DISPLAY APPARATUS AND METHOD FOR OPERATING THE IMAGE DISPLAY APPARATUS

(75) Inventors: Sangjun Koo, Seoul (KR); Kyunghee Yoo, Seoul (KR); Hyungnam Lee, Seoul (KR); Saehun Jang, Seoul (KR); Sayoon Hong, Seoul (KR); Uniyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 184 days.

(21) Appl. No.: 12/902,838

(22) Filed: Oct. 12, 2010

(65) Prior Publication Data

US 2011/0154406 A1 Jun. 23, 2011

(30) Foreign Application Priority Data

Dec. 17, 2009 (KR) .................. 10-2009-0126348

(51) Int. Cl.
*G06F 3/00* (2006.01)
*G06F 13/00* (2006.01)
*G06F 3/048* (2006.01)
*H04N 5/445* (2011.01)
*G09G 5/00* (2006.01)

(52) U.S. Cl.
USPC ............. 725/43; 725/37; 725/38; 725/44; 715/716; 715/788; 345/659

(58) Field of Classification Search
USPC ......... 345/619, 649–659; 340/815.86–815.88
See application file for complete search history.

(56) References Cited

U.S. PATENT DOCUMENTS

| 2009/0002218 | A1* | 1/2009 | Rigazio et al. ................. 341/176 |
| 2010/0088630 | A1* | 4/2010 | Morris ........................... 715/781 |
| 2010/0238109 | A1* | 9/2010 | Cook et al. ..................... 345/156 |
| 2011/0169865 | A1* | 7/2011 | Hagiwara ....................... 345/659 |

FOREIGN PATENT DOCUMENTS

| KR | 10-2002-0001361 | 1/2002 |
| KR | 10-2007-0010600 | 1/2007 |
| KR | 10-2007-0036953 | 4/2007 |

* cited by examiner

*Primary Examiner* — Chris Parry
*Assistant Examiner* — Omar S Parra
(74) *Attorney, Agent, or Firm* — KED & Associates, LLP

(57) ABSTRACT

A display method of an image display apparatus that includes receiving a broadcast signal, displaying a first number of thumbnail images when the image display apparatus is in a first position (the thumbnail images being based on the received broadcast signal), rotating the image display apparatus from the first position to a second position, and displaying a second number of thumbnail images when the image display apparatus is rotated to the second position, and the second number is different than the first number.

17 Claims, 12 Drawing Sheets

IMAGE DISPLAY APPARATUS AND METHOD FOR OPERATING THE IMAGE DISPLAY APPARATUS

This application claims priority benefit from Korean Patent Application No. 10-2009-0126348, filed Dec. 17, 2009, the subject matter of which is incorporated herein by reference.

BACKGROUND

1. Field

Embodiments may relate to an image display apparatus and a method for operating the image display apparatus. More particularly, embodiments may relate to an image display apparatus and an operation method therefore that enables a user to identify contents of video signals received on channels intuitively and efficiently.

2. Background

An image display apparatus may have a function of displaying images viewable to a user. The image display apparatus may display a broadcasting program selected by the user on a display from among broadcasting programs transmitted from broadcasting stations. A recent trend is a worldwide shift from analog broadcasting to digital broadcasting.

Digital broadcasting may offer many advantages over analog broadcasting such as robustness against noise, less data loss, ease of error correction, and an ability to provide high-definition, clear images. Digital broadcasting may also allow interactive services for viewers.

Additionally, more broadcasting programs may be transmitted to meet various user demands. A user may switch through available channels one by one to find out what the broadcasting programs are about, thus taking much time.

BRIEF DESCRIPTION OF THE DRAWINGS

Arrangements and embodiments may be described in detail with reference to the following drawings in which like reference numerals refer to like elements and wherein.

DETAILED DESCRIPTION

Exemplary embodiments of the present invention may be described below with reference to the attached drawings.

The terms "module" and "portion" attached to describe names of components may be used herein to help understanding of components and thus should not be considered as having specific meanings or roles. Accordingly, the terms "module" and "portion" may be interchangeable in their use.

Figure 1:
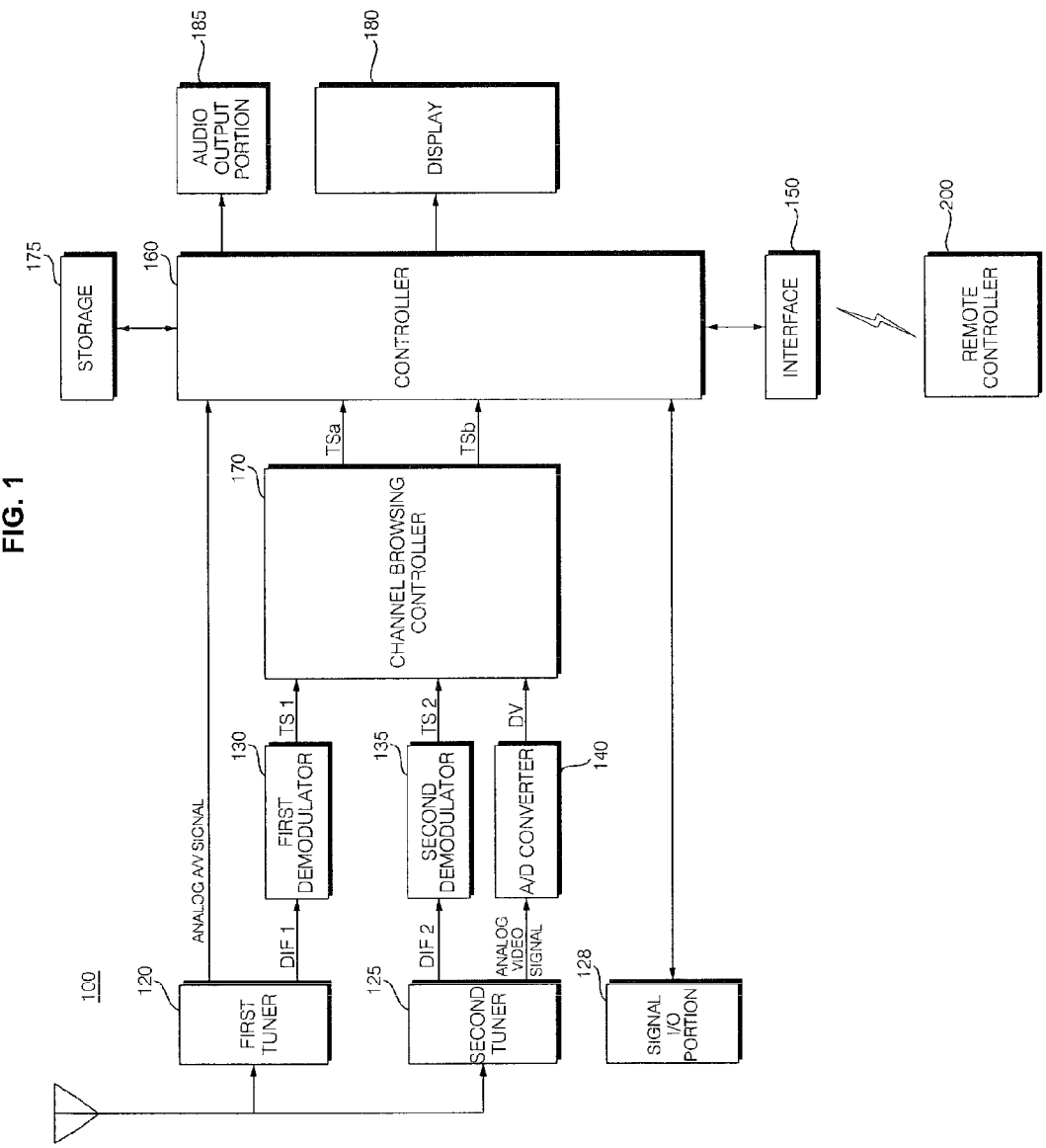
FIG. 1 is a block diagram of an image display apparatus according to an exemplary embodiment of the present invention.

FIG. 1 is a block diagram of an image display apparatus according to an exemplary embodiment of the present invention. Other embodiments and configurations are also within the scope of the present invention.

FIG. 1 shows an image display apparatus 100 that includes a first tuner 120, a second tuner 125, a signal Input/Output (I/O) portion 128, a first demodulator 130, a second demodulator 135, an Analog-to-Digital (A/D) converter 140, an interface 150, a controller 160, a channel browsing processor 170, a storage 175, a display 180, and an audio output portion 185.

The first tuner 120 may select a Radio Frequency (RF) broadcast signal corresponding to a channel selected by a user from among a plurality of RF broadcast signals received through an antenna and downconvert the selected RF broadcast signal to a digital Intermediate Frequency (IF) signal and/or an analog baseband Audio/Video (A/V) signal. More specifically, if the selected RF broadcast signal is a digital broadcast signal, the first tuner 120 may downconvert the selected RF broadcast signal to a digital IF signal DIF 1. On the other hand, if the selected RF broadcast signal is an analog broadcast signal, the first tuner 120 may downconvert the selected RF broadcast signal to an analog baseband A/V signal CVBS/SIF. The first tuner 120 may be a hybrid tuner capable of processing not only digital broadcast signals but also analog broadcast signals. The analog baseband A/V signal CVBS 1/SIF may be directly input to the controller 160.

The first tuner 120 may receive RF broadcast signals from an Advanced Television Systems Committee (ATSC) single-carrier system and/or from a Digital Video Broadcasting (DVB) multi-carrier system.

The second tuner 125, like the first tuner 120, may select the RF broadcast signal corresponding to the channel selected by the user from among the plurality of RF broadcast signals received through the antenna, and downconvert the selected RF broadcast signal to a second digital IF signal DIF 2 or an analog baseband A/V signal CVBS 2/SIF.

The second tuner 125 may sequentially or periodically select a number of RF broadcast signals corresponding to a number of broadcast channels preliminarily memorized in the image display apparatus 100 by a channel-add function from among the plurality of RF signals received through the antenna, and may downconvert the selected RF broadcast signals to IF signals or baseband A/V signals. One or more video frames acquired from each of the preliminarily memorized channels may be displayed on at least a part of the display 180 as a thumbnail image. Thus, the RF broadcast signals corresponding to all of the preliminarily memorized channels may be received sequentially or periodically.

The first tuner 120 may downconvert a main RF broadcast signal selected by the user to an IF signal or a baseband A/V signal, and the second tuner 125 may sequentially or periodically select all RF broadcast signals or all other RF broadcast signals (i.e., sub-RF broadcast signals) except for the main RF broadcast signal and downconvert the selected RF broadcast signals to IF signals or baseband A/V signals.

The first demodulator 130 may receive the first digital IF signal DIF 1 from the first tuner 120 and demodulate the first digital IF signal DIF 1.

If the first digital IF signal DIF 1 is an ATSC signal, the first demodulator 130 may perform 8-Vestigal SideBand (VSB) demodulation on the first digital IF signal DIF 1. The first demodulator 130 may also perform channel decoding. For the channel decoding, the first demodulator 130 may include a Trellis decoder (not shown), a deinterleaver (not shown) and a Reed-Solomon decoder (not shown) and perform Trellis decoding, deinterleaving and Reed-Solomon decoding.

If the first digital IF signal DIF 1 is a DVB signal, the first demodulator 130 may perform Coded Orthogonal Frequency Division Multiple Access (COFDMA) demodulation on the first digital IF signal DIF 1. The first demodulator 130 may also perform channel decoding. For the channel decoding, the first demodulator 130 may include a convolution decoder (not shown), a deinterleaver (not shown), and a Reed-Solomon decoder (not shown) and may perform convolution decoding, deinterleaving, and Reed-Solomon decoding.

The signal I/O portion 128 may receive signals from an external device. For reception of the external input signals, the signal I/O portion 128 may include an A/V Input/Output (I/O) portion (not shown) and a wireless communication module (not shown).

The signal I/O portion 128 may transmit signals to and/or receive signals from external devices. For the external signal transmission and reception, the signal I/O portion 128 may include an A/V I/O portion and a wireless communication module.

The signal I/O portion 128 may be connected to an external device such as a Digital Versatile Disc (DVD), a Bluray disc, a gaming device, a camcorder, and/or a computer (e.g., a laptop computer). The signal I/O portion 128 may externally receive video, audio, and/or data signals from the external device and transmit the received external input signals to the controller 160. Additionally, the signal I/O portion 128 may output video, audio, and data signals processed by the controller 160 to the external device.

In order to receive or transmit A/V signals from or to the external device, the A/V I/O portion of the signal I/O portion 128 may include an Ethernet port, a Universal Serial Bus (USB) port, a Composite Video Banking Sync (CVBS) port, a component port, a Super-video (S-video) (analog) port, a Digital Visual Interface (DVI) port, a High-Definition Multimedia Interface (HDMI) port, a Red-Green-Blue (RGB) port, a D-sub port, an Institute of Electrical and Electronics Engineers (IEEE)-1394 port, a Sony/Philips Digital Interconnect Format (S/PDIF) port, and/or a LiquidHD port.

Various input signals received through the signal I/O portion 128 may be input to the channel browsing processor 170 and may be subject to a thumbnail image extraction operation performed by the channel browsing processor 170. For example, analog signals received through the CVBS port and the S-video port may be converted into digital signals by the A/D converter 140 and then input to the channel browsing processor 170. Digital signals received through the Ethernet port, the USB port, the component port, the DVI port, the HDMI port, the RGB port, the D-sub port, the IEEE-1394 port, the S/PDIF port and the LiquidHD port may be directly input to the channel browsing processor 170 without the need for A/D conversion. A digital signal output from the signal I/O portion 128 may be a stream signal, for example, an MPEG-2 Transport Stream (TS) in which an MPEG-2 video signal and a Dolby AC-3 audio signal are multiplexed.

The wireless communication module of the signal I/O portion 128 may wirelessly access the Internet. For the wireless Internet access, the wireless communication module may operate based on Wireless Local Area Network (WLAN) (i.e., Wi-Fi), Wireless Broadband (Wibro), World Interoperability for Microwave Access (WiMax), and/or High Speed Downlink Packet Access (HSDPA).

Additionally, the wireless communication module may perform short-range wireless communication with other electronic devices. For the short-range wireless communication, the wireless communication module may use Bluetooth, Radio-Frequency IDentification (RFID), Infrared Data Association (IrDA), Ultra WideBand (UWB), and/or ZigBee.

The signal I/O portion 128 may be connected to various set-top boxes through at least one of the Ethernet port, the USB port, the CVBS port, the component port, the S-video port, the DVI port, the HDMI port, the RGB port, the D-sub port, the IEEE-1394 port, the S/PDIF port, and the LiquidHD port and may thus receive data from or transmit data to the various set-top boxes. For example, when connected to an Internet Protocol Television (IPTV) set-top box, the signal I/O portion 128 may transmit video, audio and data signals processed by the IPTV set-top box to the controller 160 and may transmit various signals received from the controller 160 to the IPTV set-top box. Additionally, video, audio and data signals processed by the IPTV set-top box may be processed by the channel browsing processor 170 and then by the controller 160.

The first demodulator 130 may perform demodulation and channel decoding on the first digital IF signal DIF 1 received from the first tuner 120, thereby obtaining a first stream signal TS 1. The first stream signal TS 1 may be a signal in which a video signal, an audio signal and a data signal are multiplexed. For example, the first stream signal TS 1 may be an MPEG-2 TS obtained by multiplexing an MPEG-2 video signal and a Dolby AC-3 audio signal. An MPEG-2 TS may include a 4-byte header and a 184-byte payload.

The first stream signal TS 1 may be input to the controller 160 and may thus be subjected to demultiplexing and signal processing. The first stream signal TS 1 may be input to the channel browsing processor 170 and may thus be subject to a channel browsing operation prior to input to the controller 160. The channel browsing operation may be described below in more detail.

In order to properly handle not only ATSC signals but also DVB signals, the first demodulator 130 may include an ATSC demodulator and a DVB demodulator.

The second demodulator 135 may receive the second digital IF signal DIF 2 from the second tuner 125 and demodulate the second digital IF signal DIF 2, thereby generating a second stream signal TS 2. Operation of the second demodulator 135 may be almost the same as operation of the first demodulator 130.

An analog baseband video signal CVBS 2 output from the second tuner 125 may need to be digitized by the A/D converter 140.

The A/D converter 140 may convert a received analog signal to a digital signal. If the received analog signal is a video signal, the A/D converter 140 may perform sampling and quantization on the analog signal, thereby obtaining the digital video signal DV. The digital video signal DV may be a signal yet to be encoded. The digital video signal DV may be provided to the channel browsing processor 170 for processing.

The interface 150 may transmit a signal received from the user to the controller 160 or transmit a signal received from the controller 160 to the user. For example, the interface 150 may receive various user input signals such as a power-on/off signal, a channel selection signal, and a screen setting signal from a remote controller 200 or may transmit a signal received from the controller 160 to the remote controller 200.

The controller 160 may demultiplex an input stream signal into a number of signals and process the demultiplexed signals so that the processed signals can be output as audio and video data. The controller 160 may provide overall control to the image display apparatus 100.

The controller 160 may include a demultiplexer (not shown), a video processor (not shown), an audio processor (not shown), and/or a user input processor (not shown).

The controller 160 may demultiplex an input stream signal (e.g. an MPEG-2 TS) into a video signal, an audio signal and a data signal.

The controller 160 may process the video signal. For example, if the video signal is an encoded signal, the controller 160 may decode the video signal. More specifically, if the video signal is an MPEG-2 encoded signal, the controller 160 may decode the video signal by MPEG-2 decoding. On the other hand, if the video signal is an H.264-encoded DMB or DVB-handheld (DVB-H) signal, the controller 160 may decode the video signal by H.264 decoding.

The controller 160 may additionally adjust the brightness, tint and/or color of the video signal.

The video signal processed by the controller 160 may be displayed on the display 180. Alternatively, the video signal processed by the controller 160 may be output to an external output port connected to an external output device.

The controller 160 may process the audio signal obtained by demultiplexing the input stream signal. For example, if the audio signal is an encoded signal, the controller 160 may decode the audio signal. More specifically, if the audio signal is an MPEG-2 encoded signal, the controller 160 may decode the audio signal by MPEG-2 decoding. On the other hand, if the audio signal is an MPEG-4 Bit Sliced Arithmetic Coding (BSAC)-encoded terrestrial DMB signal, the controller 160 may decode the audio signal by MPEG-4 decoding. On the other hand, if the audio signal is an MPEG-2 Advanced Audio Coding (AAC)-encoded DMB or DVB-H signal, the controller 180 may decode the audio signal by AAC decoding.

The controller 160 may additionally adjust the base, treble and/or sound volume of the audio signal.

The audio signal processed by the controller 160 may be output to the audio output portion 185 (e.g., a speaker). Alternatively, the audio signal processed by the controller 160 may be output to an external output port connected to an external output device.

The controller 160 may process the data signal obtained by demultiplexing the input stream signal. For example, if the data signal is an encoded signal such as an Electronic Program Guide (EPG), which is a guide to scheduled broadcast TV or radio programs, including broadcasting info nation about starting and ending times of a broadcast program played on each channel, the controller 160 may decode the data signal. Examples of an EPG include ATSC-Program and System Information Protocol (PSIP) information and DVB-Service Information (SI). ATSC-PSIP information or DVB-SI information that may be included in a header of a TS (i.e., a 4-byte header of an MPEG-2 TS).

The controller 160 may perform On-Screen Display (OSD) processing. More specifically, the controller 160 may generate an OSD signal for displaying various pieces of information on the display 180 as graphic or text data based on a user input signal received from the remote controller 200 and at least one of a processed video signal and a processed data signal. The OSD signal may be input to the display 180 along with the processed video and data signals.

The OSD signal may include various data such as a User-Interface (UI) screen, various menu screens, widgets, and/or icons for the image display apparatus 100.

The channel browsing processor 170 may perform channel browsing on at least one of a plurality of broadcast signals corresponding to a plurality of received channels, various input video signals received from the signal I/O portion 128, and/or both. More specifically, the channel browsing processor 170 may receive the demodulated and channel-decoded first or second stream signal TS 1 or TS 2 from the first or second demodulator 130 or 135, a stream signal from the signal I/O portion 128, or the digital signal DV from the A/D converter 140, demultiplex the first or second stream signal TS 1 or TS 2, and extract some of the frames of a video signal obtained by the demultiplexing. Thereafter, the channel browsing processor 170 may generate a new TS signal (i.e., a sub-stream signal TSa) by multiplexing a video signal including the extracted video frames. For example, the sub-stream signal TSa and a main-stream signal TSb may both be MPEG-2 TSs.

The channel browsing processor 170 may output the main-stream signal TSb, which may correspond to a main video signal to be displayed in a main area of the display 180, without any processing. On the other hand, the channel browsing processor 170 may perform channel browsing on a sub-video signal, which is to be displayed in a sub-area of the display 180, thereby obtaining the sub-stream signal TSa.

The channel browsing processor 170 may extract some of the video frames of each of a plurality of broadcast signals received through a plurality of channels and re-encode the extracted video frames into a TS, thereby displaying a channel list on the display 180. Since at least part of the broadcast signals received through the plurality of channels are displayed on the display 180 as thumbnail images, the user may intuitively identify contents of broadcast programs received on the plurality of channels.

The channel browsing processor 170 may extract some of the video frames of each of various external input signals received from the signal I/O portion 128 and re-encode the extracted video frames into a stream, thereby displaying an external input image list on the display 180. At least part of a plurality of external input video signals received from a plurality of external input devices may be displayed on the display 180 as thumbnail images. Therefore, the user may intuitively identify external contents received from the external input devices based on the external input image list.

The channel browsing processor 170 may extract some of the video frames of each of a plurality of broadcast signals received through a plurality of channels and some of the video frames of each of various external input signals received from the signal I/O portion 128 and re-encode the extracted video frames into TSs, thereby displaying a channel list and an external input image list on the display 180. Since at least part of the broadcast signals and the external input signals are displayed on the display 180 as thumbnail images, the user may intuitively identify contents of broadcast programs received through the plurality of channels and the external input signals received from the external input devices.

Structure and operation of the channel browsing processor 170 may be described below in further detail with reference to FIG. 2.

The storage 175 may store various programs for processing and controlling signals by the controller 160, and may also store processed video, audio and data signals.

The storage 175 may temporarily store a video, audio and/or data signal received from the signal I/O portion 128.

The storage 175 may also memorize broadcast channels by a channel-add function.

The storage 175 may include, for example, at least one of a flash memory-type storage medium, a hard disc-type storage medium, a multimedia card micro-type storage medium, a card-type memory (e.g. an Secure Digital (SD) or eXtreme Digital (XS) memory), a Random Access Memory (RAM) and/or a Read-Only Memory (ROM).

While the storage 175 shown in FIG. 1 as configured separately from the controller 160, the storage 175 may be incorporated into the controller 160, for example.

The image display apparatus 100 may play a file (such as a moving picture file, a still image file, a music file, or a text file) stored in the storage 175 to the user.

The display 180 may convert a processed video signal, a processed data signal, and an OSD signal received from the controller 160 or a video signal and a data signal received from the signal I/O portion 128 to RGB signals, thereby generating driving signals. The display 180 may be implemented into various types of displays such as a Plasma Display Panel (PDP), a Liquid Crystal Display (LCD), an Organic Light Emitting Diode (OLED), a flexible display, and a three-dimensional (3D) display. The display 180 may also be implemented as a touch screen so that it is used not only as an output device but also as an input device.

The audio output portion 185 may receive a processed audio signal (e.g., a stereo signal, a 3.1-channel signal or a 5.1-channel signal) from the controller 160 and output the received audio signal as voice. The audio output portion 185 may be implemented into various types of speakers.

The remote controller 200 may transmit a user input to the interface 150. For transmission of a user input, the remote controller 200 may use various communication techniques such as Bluetooth, RF, IR, UWB and/or ZigBee.

The remote controller 200 may additionally receive a video signal, an audio signal and a data signal from the interface 150 and output the received signals.

The remote controller 200 may be a pointing device. A pointing device may be described in great detail with reference to FIGS. 3A and 3B.

While two tuners are shown in FIG. 1 to display thumbnail images when a channel list is displayed, an exemplary embodiment may also be implemented by use of a single tuner.

For example, when a channel list display command is issued during receiving a broadcast signal on a selected channel through the single tuner, the single tuner may receive broadcast signals corresponding to all of the broadcast channels preliminarily memorized by the channel-add function, sequentially or periodically. A channel list may be viewed in a full-view mode.

The image display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs or may be a mobile digital broadcast receiver capable of receiving at least one of terrestrial DMB broadcast programs, satellite DMB broadcast programs, ATSC-M/H broadcast programs, DVB-H (COFDM) broadcast programs, and/or Media Forward Link Only (MediaFLO) broadcast programs. Alternatively, the image display apparatus 100 may be a digital broadcast receiver capable of receiving cable broadcast programs, satellite broadcast programs and/or IPTV programs.

Examples of the image display apparatus 100 may be a TV receiver, a mobile phone, a smart phone, a laptop computer, a digital broadcast receiver, a Personal Digital Assistant (PDA) and/or a Portable Multimedia Player (PMP).

Figure 2:
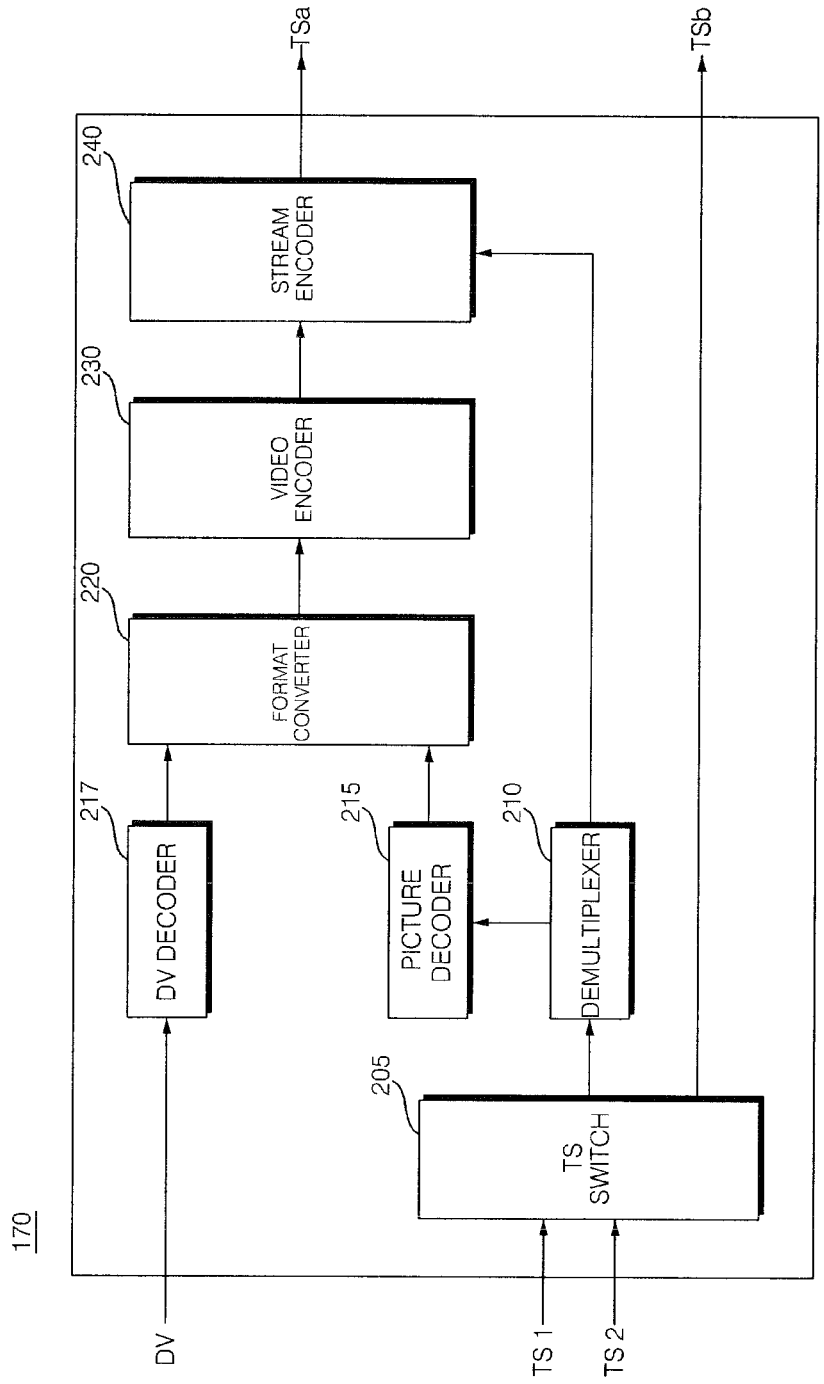
FIG. 2 is a block diagram of a channel browsing controller (from FIG. 1)

FIG. 2 is a block diagram of the channel browsing processor 170 (from FIG. 1).

As shown in FIG. 2, the channel browsing processor 170 may include a TS switch 205, a demultiplexer 210, a picture decoder 215, a DV decoder 217, a format converter 220, a video encoder 230, and/or a stream encoder 240.

The TS switch 205 may select one of the first and second stream signals TS 1 and TS 2, output the selected stream signal as the main-stream signal TSb without any processing, and transmit the other stream signal to the demultiplexer 210 as a sub-stream signal. The main-stream signal, which may correspond to a main video signal, may be displayed across almost an entire area of the display 180. The sub-stream signal, which may correspond to a sub-video signal, may be displayed only on a certain part of the display 180.

A channel list, an external input image list, and/or both may be displayed in a compact-view mode in a certain area on the display 180.

The demultiplexer 210 may demultiplex the first or second stream signal TS 1 or TS 2 into a video signal, an audio signal and a data signal, output the video signal to the picture decoder 215, and output the audio signal and the data signal to the stream encoder 240 in order for the stream encoder 240 to generate a new stream signal.

The picture decoder 215 may decode at least some of the frames of the received video signal by MPEG-2 decoding, MPEG-4 decoding or H.264 decoding. The decoded frames may be still images or moving pictures. For example, the picture decoder 215 may decode an Intra-coded (I) frame or some section of the received video signal.

The DV decoder 217 may receive the digital signal DV from the A/D converter 140 and acquire a digital video signal from the digital signal DV.

The format converter 220 may convert the format of a video signal received from the picture decoder 215 or the DV decoder 217. For example, the format converter 220 may change size (or resolution) of the input video signal. When the video signal is displayed as a thumbnail image, the size of the thumbnail image may be appropriately adjusted.

The format converter 220 may convert the input video signal to a different size according to whether the input video signal is to be displayed in a compact-view mode or in a full-view mode. For example, the size of thumbnail images displayed in the full-view mode may be greater than the size of thumbnail images displayed in the compact-view mode. A channel list, an external input image list and/or both may be displayed on the display 180 either in the compact-view mode or in the full-view mode.

The video encoder 230 may encode the video signal received from the format converter 220 by JPEG encoding or MPEG-2 encoding. Still images or moving pictures encoded by the video encoder 230 may be displayed on the display 180 as thumbnail images.

The stream encoder 240 may re-encode or multiplex the encoded video signal received from the video encoder 230 and the audio and data signals obtained by the demultiplexing performed in the demultiplexer 210 into a stream, for example, an MPEG-2 TS.

The channel browsing processor 170 may extract some of the video frames of each of a plurality of broadcast signals and a plurality of external input signals and re-encode the extracted video frames. The re-encoded images may be displayed on the display 180 as thumbnail images in response to a user input requesting the display of a channel list or an external input image list. The user may intuitively identify contents of broadcast programs received from various channels or external input signals provided by various external input devices.

Figure 3A:
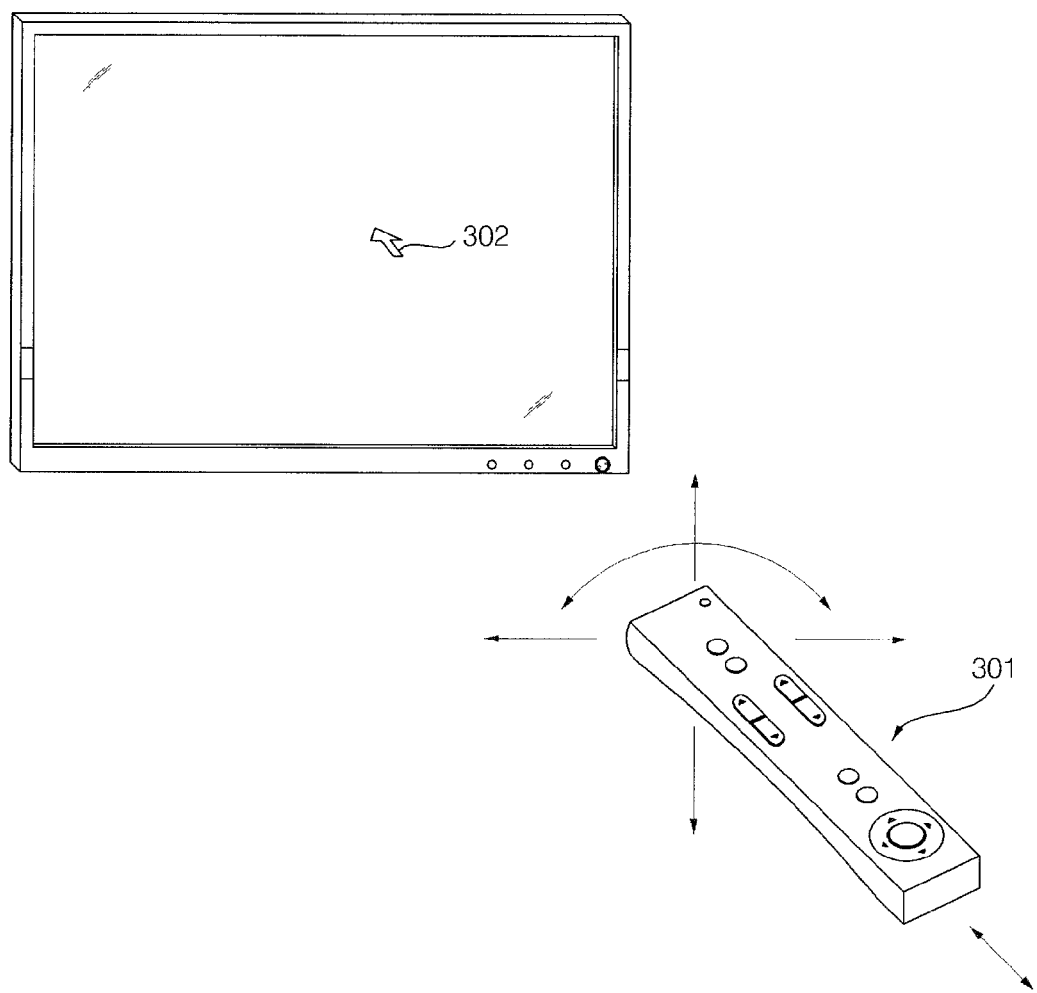
FIGS. 3A and 3B are diagrams illustrating a remote controller (from FIG. 1)
Figure 3B:
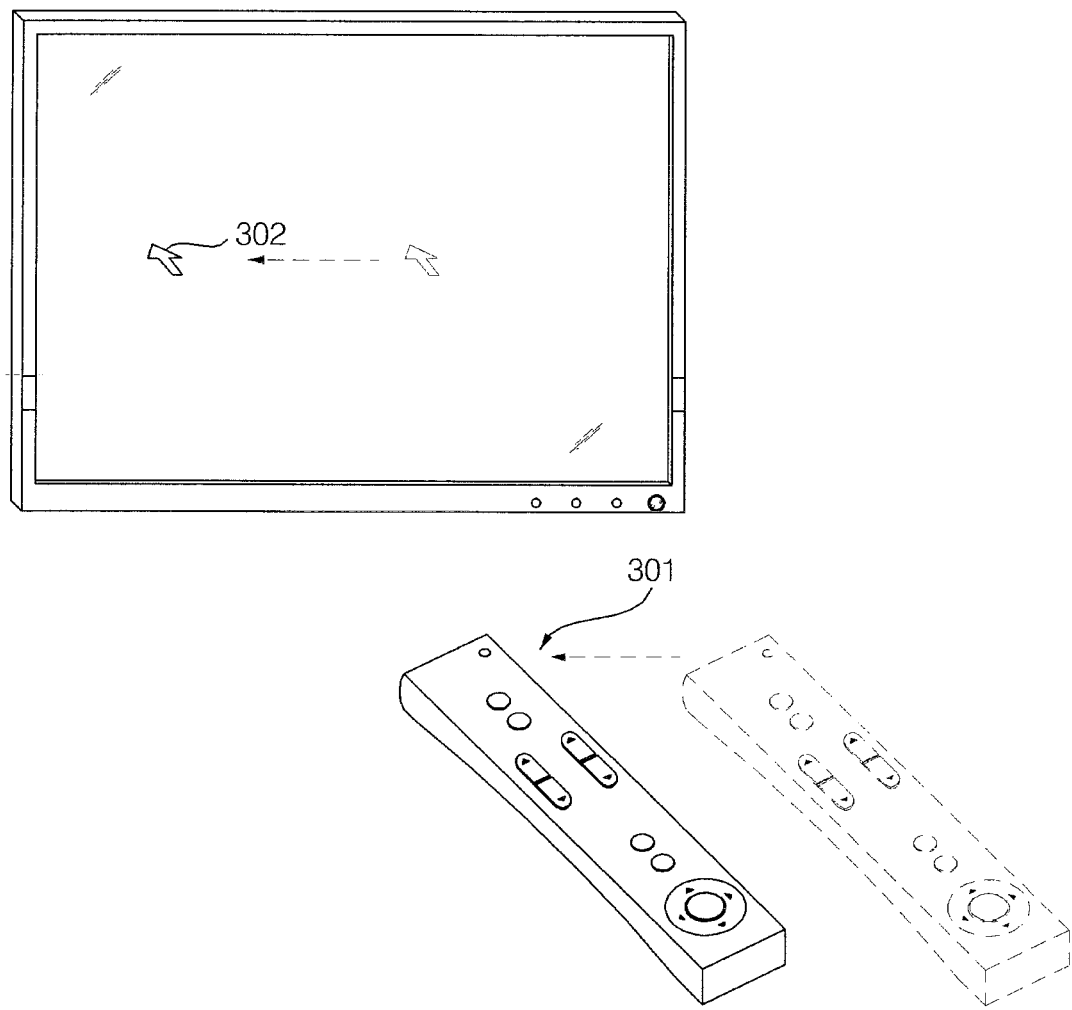

FIGS. 3A and 3B illustrate examples of the remote controller 200 (from FIG. 1).

The remote controller 200 may be a pointing device 301.

The pointing device 301 may be a kind of the remote controller 200, for entering a command to the image display apparatus 100. The pointing device 301 may transmit or receive RF signals to or from the image display apparatus 100 according to an RF communication standard. As shown in FIG. 3A, a pointer 302 representing movement of the pointing device 301 may be displayed on the image display apparatus 100.

The user may move the pointing device 301 up and down, back and forth, and side to side and/or may rotate the pointing device 301. The pointer 302 may move in accordance with movement of the pointing device 301, as shown in FIG. 3B.

Referring to FIG. 3A, if the user moves the pointing device 301 to the left, the pointer 302 may move to the left accordingly. The pointing device 301 may include a sensor capable of detecting motions. The sensor of the pointing device 301 may detect the movement of the pointing device 301 and transmit motion information corresponding to a result of the detection to the image display apparatus 100. The image display apparatus 100 may determine the movement of the pointing device 301 based on motion information received from the pointing device 301, and calculate the coordinates of a target point to which the pointer 302 should be shifted in accordance with the movement of the pointing device 301 based on a result of the determination.

Referring to FIGS. 3A and 3B, the pointer 302 may move according to a vertical movement, a horizontal movement and/or a rotation of the pointing device 301. The moving speed and direction of the pointer 302 may correspond to the moving speed and direction of the pointing device 301.

The pointer 302 may move in accordance with the movement of the pointing device 301. Alternatively, an operation command may be input to the image display apparatus 100 in response to the movement of the pointing device 301. As the pointing device 301 moves back and forth, an image displayed on the image display apparatus 100 may be gradually enlarged or reduced. This exemplary embodiment does not limit the scope and spirit of the present invention.

Figure 4:
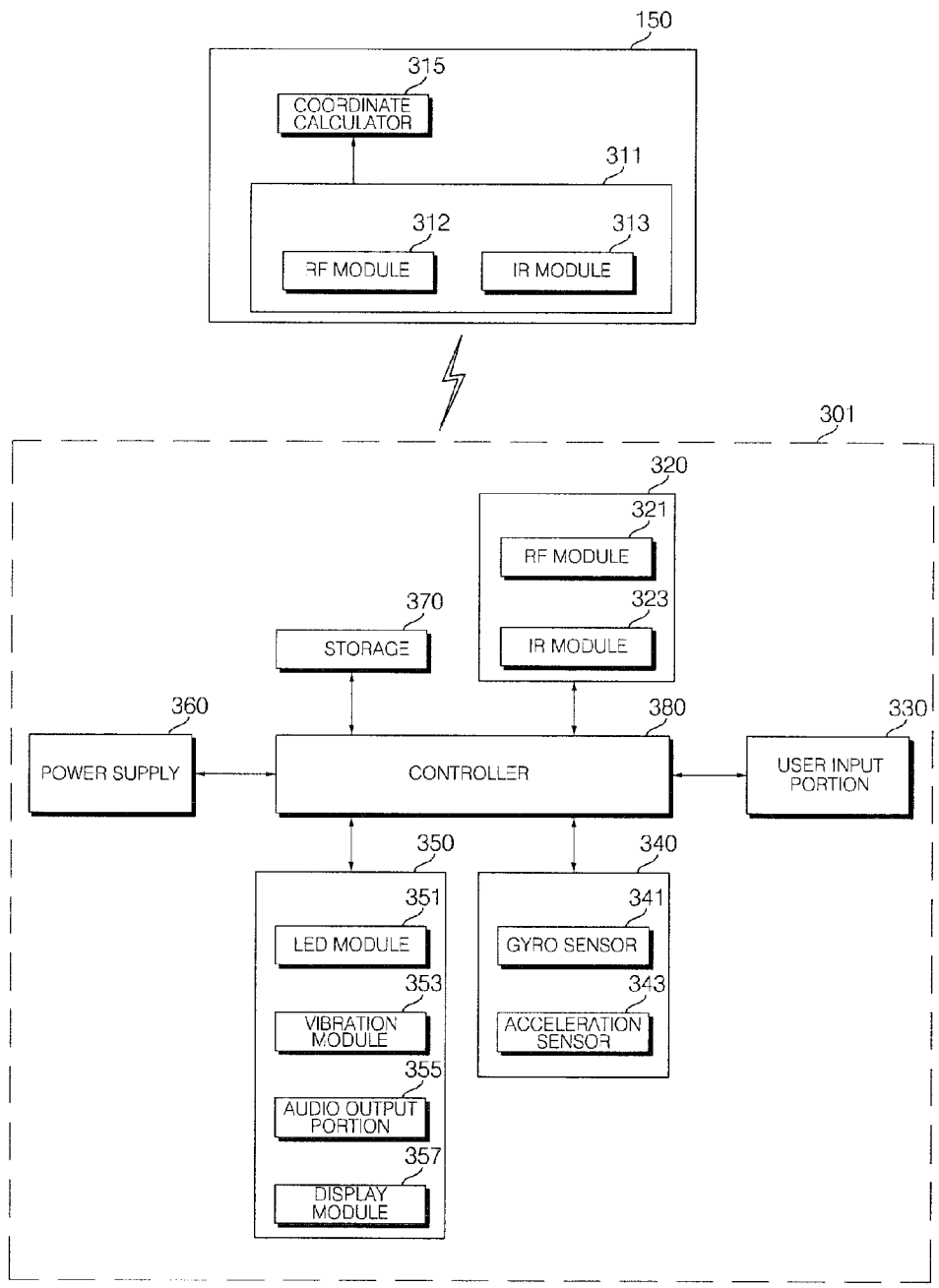
FIG. 4 is a block diagram of an interface (from FIG. 1) and a pointing device (from FIGS. 3A and 3B)

FIG. 4 is a detailed block diagram of the pointing device 301 (from FIGS. 3A and 3B) and the interface 150 (from FIG. 1). The pointing device 301 may include a wireless communication module 320, a user input portion 330, a sensor portion 340, an output portion 350, a power supply 360, a memory 370, and a controller 380.

The wireless communication module 320 may transmit signals to and/or receive signals from the image display apparatus 100. The wireless communication module 320 may include an RF module 321 for transmitting RF signals to and/or receiving RF signals from the interface 150 of the image display apparatus 100 according to an RF communication standard. The wireless communication module 320 may also include an IR module 323 for transmitting IR signals to and/or receiving IR signals from the interface 150 of the image display apparatus 100 according to an IR communication standard.

The pointing device 301 may transmit motion information regarding the movement of the pointing device 301 to the image display apparatus 100 through the RF module 321. The pointing device 301 may also receive signals from the image display apparatus 100 through the RF module 321. The pointing device 301 may transmit commands to the image display apparatus 100 through the IR module 323, when needed, such as a power on/off command, a channel switching command, and/or a sound volume change command.

The user input portion 330 may include a keypad and/or a plurality of buttons. The user may enter commands to the image display apparatus 100 by manipulating the user input portion 330. If the user input portion 330 includes a plurality of hard-key buttons, the user may input various commands to the image display apparatus 100 by pressing the hard-key buttons. If the user input portion 330 includes a touch screen displaying a plurality of soft keys, the user may input various commands to the image display apparatus 100 by touching the soft keys. The user input portion 330 may also include various input tools other than those set forth herein, such as a scroll key and/or a jog key.

The sensor portion 340 may include a gyro sensor 341 and/or an acceleration sensor 343. The gyro sensor 341 may sense movement of the pointing device 301, for example, in X-, Y-, and Z-axis directions, and the acceleration sensor 343 may sense moving speed of the pointing device 301. The output portion 350 may output a video and/or audio signal corresponding to a manipulation of the user input portion 330 or a signal transmitted by the image display apparatus 100. The user may easily identify whether the user input portion 330 has been manipulated or whether the image display apparatus 100 has been controlled based on the video and/or audio signal output by the output portion 350.

The output portion 350 may include a Light Emitting Diode (LED) module 351 that is turned on or off whenever the user input portion 330 is manipulated or whenever a signal is received from or transmitted to the image display apparatus 100 through the wireless communication module 320. The output portion 350 may also include a vibration module 353 that generates vibrations, an audio output module 355 that outputs audio data, and a display module 357 that outputs video data.

The power supply 360 may supply power to the pointing device 301. If the pointing device 301 is kept stationary for a predetermined time or longer, the power supply 360 may reduce or cut off supply of power to the pointing device 301 in order to save power. The power supply 360 may resume the power supply if a specific key on the pointing device 301 is manipulated.

The memory 370 may store various application data for controlling or driving the pointing device 301. The pointing device 301 may wirelessly transmit signals to and/or receive signals from the image display apparatus 100 in a predetermined frequency band with the aid of the RF module 321. The controller 380 of the pointing device 301 may store (in the memory 370) information regarding the frequency band used for the pointing device 301 to wirelessly transmit signals to and/or wirelessly receive signals from the image display apparatus 100, and may then refer to this information for a later use.

The controller 380 may provide overall control to the pointing device 301. For example, the controller 380 may transmit a signal corresponding to a key manipulation detected from the user input portion 330 or a signal corresponding to a motion of the pointing device 301 sensed by the sensor portion 340 to the interface 150 of the image display apparatus 100.

The interface 150 may include a wireless communication module 311 that wirelessly transmits signals to and/or wirelessly receives signals from the pointing device 301. The interface 150 may also include a coordinate calculator 315 that calculates a pair of coordinates representing the position of the pointer 302 on the display screen to which the pointer 302 is to be moved in accordance the movement of the pointing device 301.

The wireless communication module 311 may include an RF module 312 and an IR module 313. The RF module 312 may wirelessly transmit RF signals to and/or wirelessly receive RF signals from the RF module 321 of the pointing device 301. The IR module 313 may wirelessly transmit IR signals to and/or wirelessly receive IR signals from the IR module 321 of the pointing device 301.

The coordinate calculator 315 may receive motion information regarding movement of the pointing device 301 from the wireless communication module 320 of the pointing device 301 and may calculate a pair of coordinates (x, y) representing position of the pointer 302 on a screen of the first display 180 by correcting the motion information for a user's handshake or possible errors.

A signal received in the image display apparatus 100 from the pointing device 301 through the interface 150 may be transmitted to the controller 160. The controller 160 may acquire information regarding movement of the pointing device 301 and information regarding a key manipulation detected from the pointing device 301 from the signal received from the interface 150, and may control the image display apparatus 100 based on the acquired information.

Figure 5:
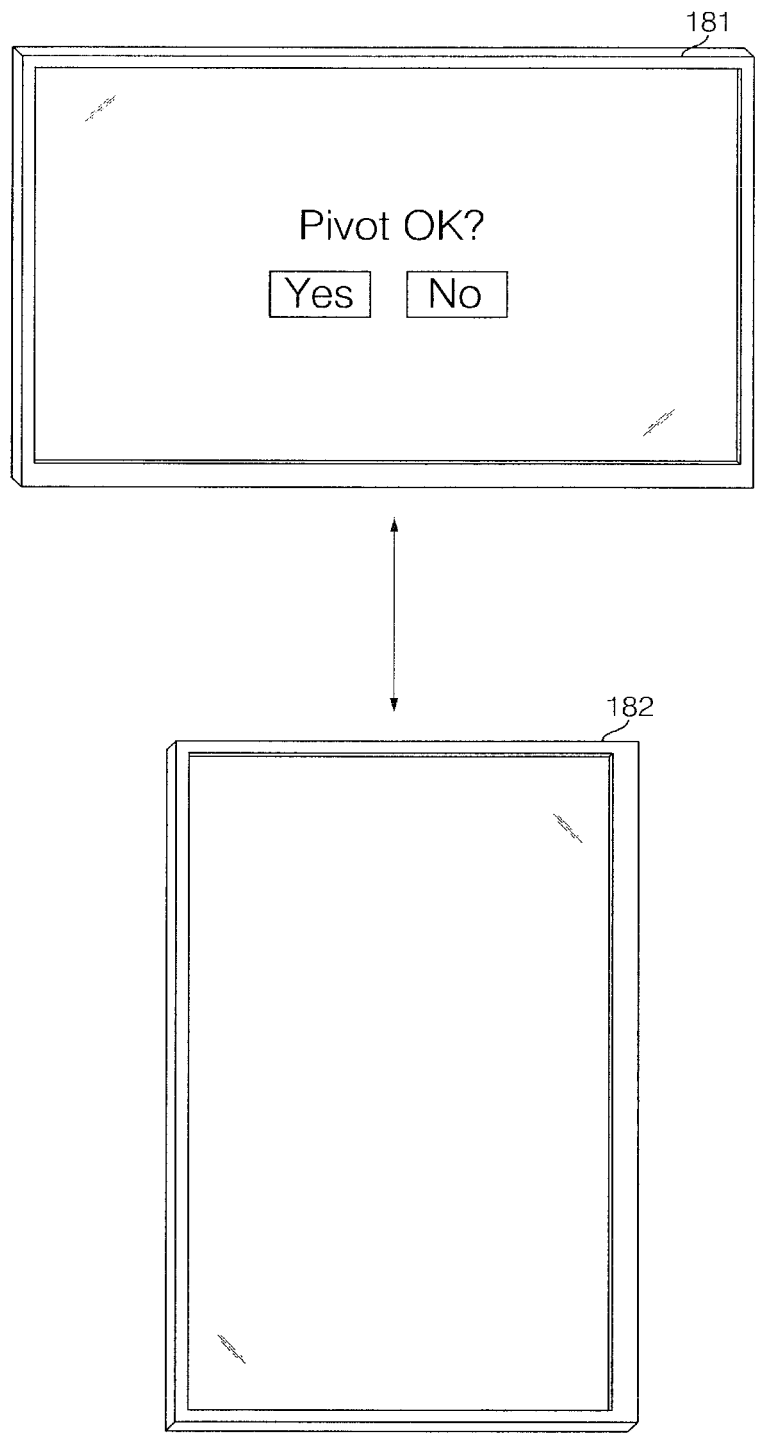
FIG. 5 is a view illustrating an example of pivoting an image display apparatus.

FIG. 5 is a view illustrating an example of pivoting or rotating the image display apparatus.

The image display apparatus 100 may be pivoted or rotated in a clockwise direction or a counterclockwise direction. The image display apparatus 100 may also be pivoted or rotated at 90 degrees or at any other predetermined angle. Pivoting or rotating may refer to rotation of the image display apparatus 100 using a specific point or a virtual line as a reference point and/or an axis.

If the image display apparatus 100 has a stand type support member or a wall type support member, the image display apparatus 100 may be pivoted or rotated by means of a rotation device included in a support member. The user may pivot or rotate the image display apparatus 100 manually by use of a rotation device. The image display apparatus 100 may also include a motor and upon receipt of a pivot command, the controller 160 may automatically pivot or rotate the image display apparatus 100 by driving the motor. Many other known pivot devices (or rotation devices) are also available.

Two modes may be available to the image display apparatus 100, a latitudinal mode or pivot release mode and a longitudinal mode or pivot setting mode. In the latitudinal mode or pivot release mode, the display 180 may take a latitudinal form 181 with a width (i.e., a horizontal dimension) larger than a length (i.e., a vertical dimension), whereas in the longitudinal mode or the pivot setting mode, the display 180 may take a longitudinal form 182 with a length (i.e., a vertical dimension) larger than a width (i.e., a horizontal dimension) resulting from 90-degree rotation in the latitudinal mode.

The controller 160 may control an image displayed on the display 180 to be pivoted (or rotated) in accordance with the pivoting motion (or rotating motion) of the image display apparatus 100.

As shown in FIG. 5, a menu prompting the user to select at least one of pivot setting and pivot release may be displayed. When the user selects pivot setting, the display 180 may be pivoted (or rotated) from the latitudinal form 181 to the longitudinal form 182. If the user selects pivot release, the display 180 may rotate so that it returns from the longitudinal form 182 to the latitudinal form 181.

More pivot setting modes may be defined for pivoting or rotating the image display apparatus 100 at various angles.

Figure 6:
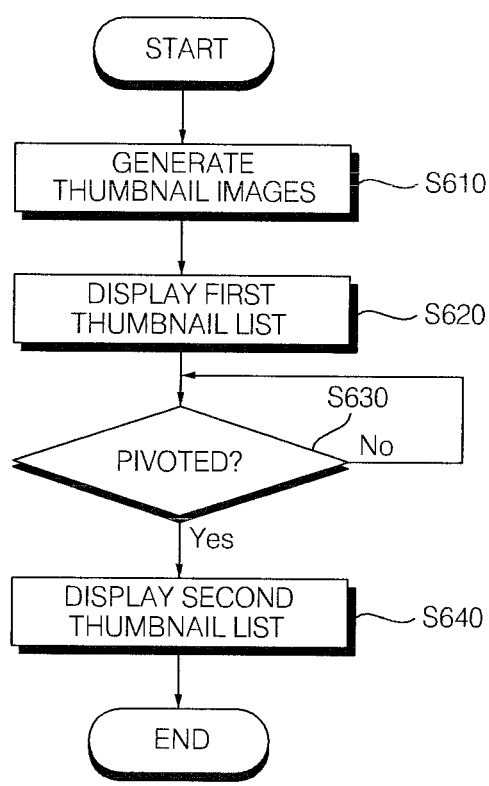
FIG. 6 is a flowchart illustrating a method for operating an image display apparatus according to an exemplary embodiment of the present invention.

FIG. 6 is a flowchart illustrating a method for operating the image display apparatus according to an exemplary embodiment. FIGS. 7 to 10 are views for describing a method for operating the image display apparatus (from FIG. 6). Other embodiments and configurations are also within the scope of embodiments of the present invention.

Referring to FIG. 6, the channel browsing processor 170 may generate or provide a plurality of thumbnail images based on an input signal in operation S610.

The input signal may be a broadcast signal received through the first or second tuner 120 or 125 or a signal received from a Contents Provider (CP) connected to the image display apparatus 100 over a network through the signal I/O portion 128. The CP may transmit contents directly to the image display apparatus 100 over the Internet. Alternatively, the CP may transmit contents to the image display apparatus 100 over the Internet via a network operator.

A first thumbnail list including at least part of the generated thumbnail images may be displayed in operation S620. The thumbnail images may be based on the received broadcast (television) signal. This may include receiving the signal via cable and/or satellite.

Figure 7:
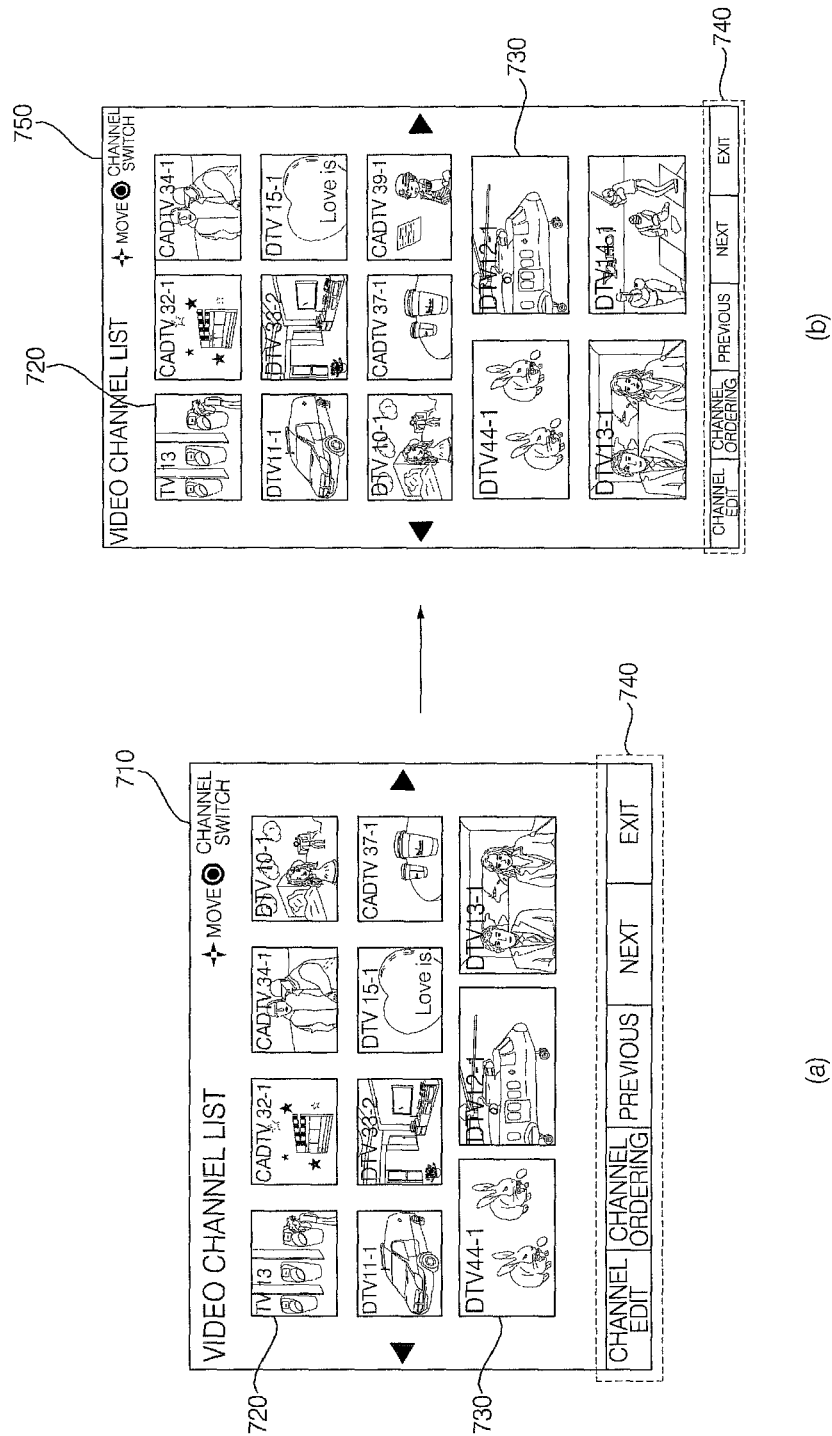
FIGS. 7 to 10 are views for describing a method for operating an image display apparatus (from FIG. 6)

As shown in FIG. 7, a first thumbnail list 710 with thumbnail images corresponding to broadcast signals received on channels may be displayed on the display 180. A text "Video Channel List" may be displayed in an upper part of the display 180. While the thumbnail images are displayed across the entire area of the display 180 in the full-view mode shown in FIG. 7, the thumbnail images may be displayed in a certain part of the display area 180 in the compact-view mode.

As the first thumbnail list 710 having a plurality of thumbnail images is displayed on the display 180, the user may intuitively identify contents of broadcast programs received on a plurality of channels.

The thumbnail images of the first thumbnail list 170 may be still images and/or moving pictures. The thumbnail images may be images currently being received or previously stored images.

In the operation method of the image display apparatus 100, at least one of the plurality of thumbnail images may be updated and a thumbnail list including the updated thumbnail image may be displayed. That is, a thumbnail list with thumbnail images at least part of which have been updated may be displayed on the display 180. The thumbnail image update may take place randomly and/or periodically, and all or part of the thumbnail images may be updated.

The thumbnail images based on received broadcast signals may correspond to broadcast signals of preliminarily memorized channels. All of the broadcast channels or the preferred broadcast channels may have been preliminarily memorized.

The first thumbnail list 710 displayed on the display 180 may further include edit menu items 740 based on the displayed thumbnail images in a lower part of the display 180 and/or in another area of the display 180.

The edit menu items 740 may include menu items "Previous" for displaying a thumbnail list previous to the displayed thumbnail list, "Next" for displaying a thumbnail list following the displayed thumbnail list, and/or "Exit" for shifting from "Video Channel List" to another menu.

The menu items 740 may further include menu items "View Channel Info" (not shown) for providing detailed information about a channel corresponding to a selected thumbnail image, "Compact View" (not shown) for displaying thumbnail images on a part of the display 180 while displaying an image corresponding to a selected channel on another part of the display 180, "Schedule Viewing" (not shown) for scheduling viewing of a selected future program, and/or "Zoom" (not shown) for enlarging or reducing a thumbnail image or a thumbnail list.

A plurality of thumbnail images may be displayed in different sizes. For example, thumbnail images may be displayed at different aspect ratios, such as a thumbnail image 720 with an aspect ratio of 4:3 and a thumbnail image 730 with an aspect ratio of 16:9. Therefore, the user may intuitively identify aspect ratios of images of broadcast signals corresponding to the thumbnail images. Although sizes of thumbnail images have been described in the context of the aspect ratios of 4:3 and 16:9, thumbnail images may be displayed in different sizes according to resolutions of broadcast signals on channels corresponding to the thumbnail images in a similar manner.

When the image display apparatus 100 is pivoted (or rotated) in operation S630, the controller 160 may control the first thumbnail list 710 to be converted to a second thumbnail list 750 on the display 180 in operation S640. The first and second thumbnail lists 710 and 750 may have different numbers of thumbnail images, as shown in FIG. 7. In other words, a first number of thumbnail images may be displayed in FIG. 7(*a*). Upon rotation of the image display apparatus 100, a second number of thumbnail images may be displayed in FIG. 7(*b*).

An image may have a width larger than a length as noted from major aspect ratios 4:3 and 16:9, when the image is displayed on a screen. Therefore, thumbnail images may be scaled down at the same aspect ratio, or even though the aspect ratio is partially adjusted, the thumbnail images may be displayed to be wider than longer. Menus may be arranged along a horizontal direction. Upon rotation of the image display apparatus 100, aspect ratios of the thumbnail images may change.

As shown in FIG. 7, the display 180 may display more thumbnail images in the longitudinal form 182 than in the latitudinal form 181, despite a same area. Accordingly, the user may intuitively identify more images and thus select an intended channel faster.

A menu prompting the user to select at least one of pivot setting or pivot release for the image display apparatus 100 may be displayed, as shown in FIG. 5. If the user selects pivot setting, the display 180 may be pivoted (or rotated) from the latitudinal form 181 to the longitudinal form 182. If the user selects pivot release, the display 180 may return from the longitudinal form 182 to the latitudinal form 181.

When one of thumbnail images is selected from the second thumbnail list 720, an image corresponding to the selected thumbnail images may be displayed on the display 180.

The thumbnail image selection may be made by means of the pointer or a cursor, for example. More specifically, the cursor may be shifted to an intended thumbnail image by input of a directional key in the remote controller or the pointer may be shifted to the intended thumbnail image by manipulating the pointing device, thereby selecting the thumbnail image.

Figure 8:
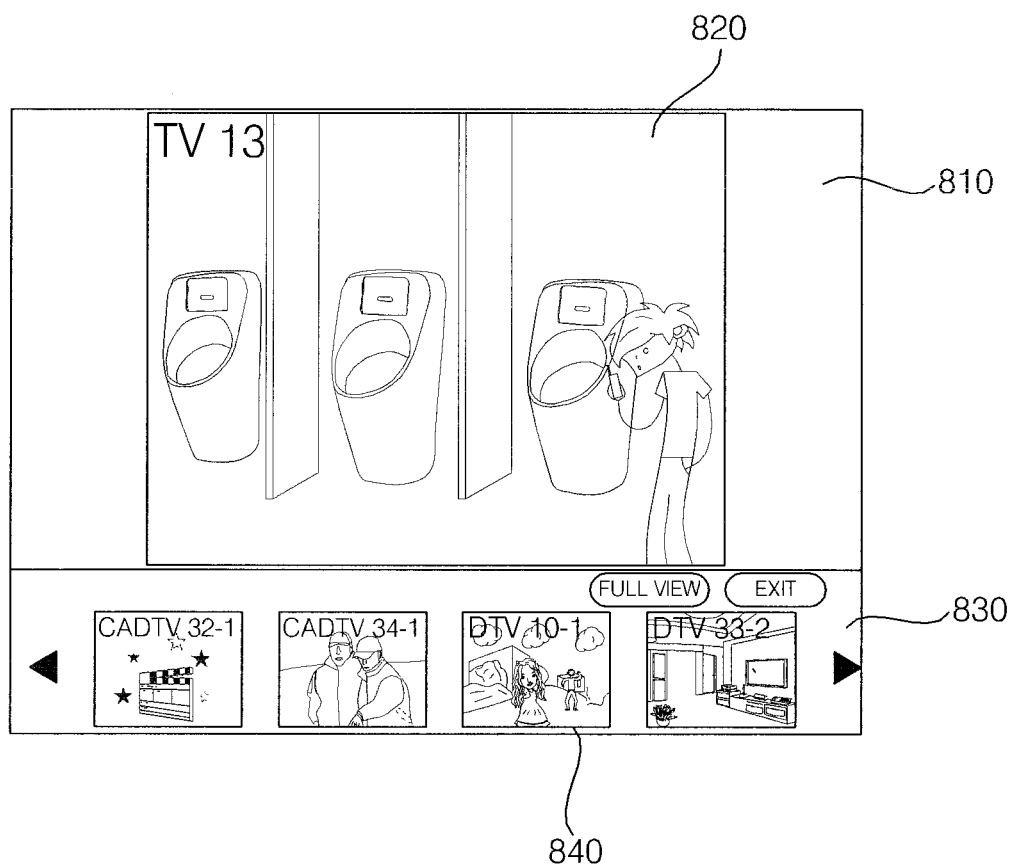
Figure 9:
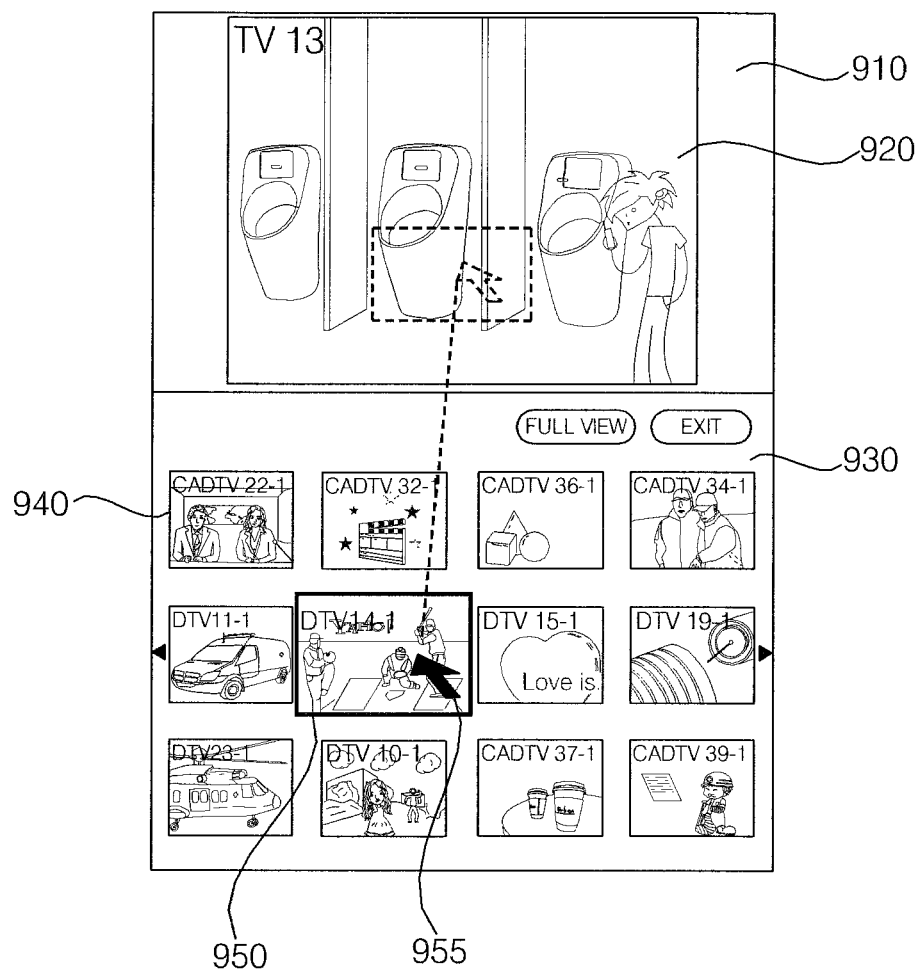
Figure 10:
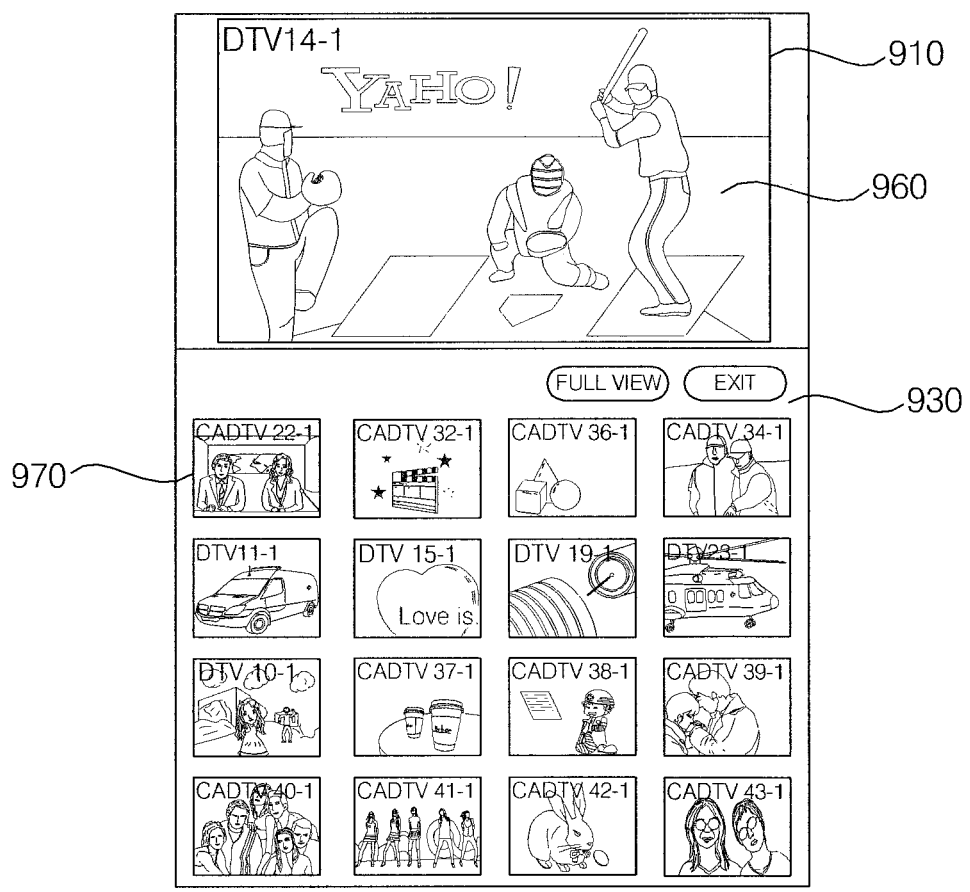

FIGS. 8, 9 and 10 show screens displayed in a compact-view mode.

As shown in FIG. 8, while a first main image 820 selected by the user, for example, an image corresponding to a terrestrial broadcast signal is displayed in a first area 810 designed for main image viewing, a thumbnail list with a plurality of thumbnail images 840 may be displayed in a second area 830 of the display 180 other than the first area 810. The thumbnail images 840 may be displayed in different sizes according to resolutions or aspect ratios of broadcast signals on channels corresponding to the thumbnail images 840.

While the first main image 820 is displayed in part of the first area 810 in FIG. 8, the displayed size of the main image 820 may be determined by taking into account the aspect ratio and screen setting of the display 180. Thus, the first main image 820 may occupy the whole first area 810, and a displayed size of the first main image 820 may be equal to a size of the first area 810.

With the first thumbnail list and the first main image 820 displayed in the display 180 as shown in FIG. 8 and when the image display apparatus 100 is pivoted (or rotated), the first thumbnail list may be replaced with a second thumbnail list on the display 180 and a second main image may be displayed in an area other than an area in which the second thumbnail list is displayed, substituting for the first main image 820.

FIG. 9 illustrates a display screen having an image displayed in accordance with a pivot motion (or rotation motion) of the image display apparatus 100. Sizes of the first and second areas may vary depending on a main image and thumbnail images displayed in the first and second areas.

A second main image 920 may be displayed in a first area 910 designed for main image viewing. The second main image 820 may be obtained by modifying the size of the first main image 829 at a same aspect ratio. That is, when the image display apparatus 100 is pivoted (or rotated), the main image may be changed in size while its aspect ratio is kept the same. When the image display apparatus 100 is pivoted (or rotated) from the latitudinal form 181 to the longitudinal form 182, a horizontal dimension of the image display apparatus 100 may be reduced. Thus, the size of an image displayed on the display 180 may decrease to maintain the aspect ratio of the display 180.

A second thumbnail list including a plurality of thumbnail images 940 and 950 may be displayed in a second area 930.

A comparison between FIG. 8 and FIG. 9 may show that the second thumbnail list is displayed over a wider area than the first thumbnail list. When the display 180 takes the longitudinal form 182 having a length larger than a width, the main image may be scaled down at the same aspect ratio. Thus, an area available to displaying of thumbnail images may be greatly increased.

The user may intuitively identify contents of more broadcast programs received on different channels in one screen, during viewing images of a selected channel or signal, thereby selecting a channel more easily and faster.

Since the aspect ratio of a main image is not distorted, the user may view the main image without an interruption.

At least one of a plurality of thumbnail images may be updated periodically or randomly. As a consequence, a latest image may be identified without channel switching.

Upon receipt of a command to focus any of the thumbnail images included in the first or second thumbnail list, the thumbnail image may be enlarged or highlighted. The focusing command may be issued by moving the cursor or the pointer using the remote controller. In FIG. 9, a thumbnail image 950 may be focused by a pointer 955 corresponding to movement of the pointing device 301 and thus the thumbnail image 950 may be enlarged on the display 180.

If a thumbnail image is a still image and is focused, the thumbnail image may be displayed as a moving picture.

When the pointer 955 of the pointing device 301 focuses one of a plurality of thumbnail images and drags the focused thumbnail image to a specific position, the thumbnail image may be moved easily or the thumbnail image may be edited. Additionally, as a thumbnail image is updated, the user may determine whether to switch to an intended channel, viewing the thumbnail image of the intended channel while a main channel is being played.

A thumbnail image may be selected by dragging the thumbnail image from the second thumbnail list and dropping the thumbnail image outside the second thumbnail list, particularly in an area in which the main image is displayed.

When the thumbnail image 950 is dragged to and dropped in the first area 910 as shown in FIG. 9, the main image may be replaced with an image of a channel corresponding to the thumbnail image 950 as shown in FIG. 10. Alternatively, a thumbnail image may be selected by moving the cursor or the pointer to the thumbnail image and then inputting a key of the remote controller. That is, if one of the thumbnail images in the second thumbnail list is selected, an image of a channel or a signal corresponding to the selected thumbnail image may be displayed as a main image.

A method for operating the image display apparatus may include changing a number of thumbnail images in the second thumbnail list according to at least one of the aspect ratio and size of the image of the channel corresponding to the thumbnail image 950.

Referring to FIG. 10, the screen of the display 180 having a length larger than a width may be divided into the first area 910 and the second area 930 (under the first area 910).

An image 960 having an aspect ratio of 16:9 may be displayed in the first area 910, and a thumbnail list having a plurality of thumbnail images 970 may be displayed in the underlying second area 930. The size of the second area 930 may be determined according to the aspect ratio of the image 960 displayed in the first area 910.

If the main image 920 having an aspect ratio of 4:3 (shown in FIG. 9) is replaced with the main image 960 having an aspect ratio of 16:9 (shown in FIG. 10), more thumbnail images may be provided in the thumbnail list.

The number of displayed thumbnail images may increase without distorting the aspect ratio of the main image.

Figure 11:
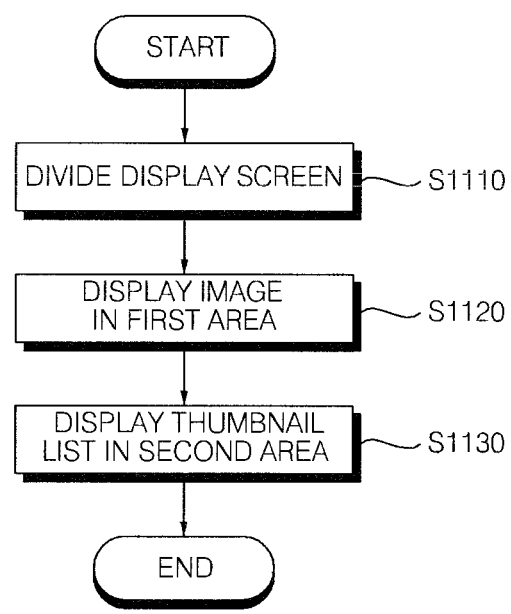
FIG. 11 is a flowchart illustrating a method for operating an image display apparatus according to an exemplary embodiment of the present invention.

FIG. 11 is a flowchart illustrating a method for operating an image display apparatus according to another exemplary embodiment. A description of operations as described above may not be described in the following description of FIG. 11.

A method for operating the image display apparatus may involve dividing the screen of the display 180 having the longitudinal form 182 with a length larger than a width into the upper first area 910 and the lower second area 930 (operation S1110), displaying a main image in the first area 910 (operation S1120), and displaying a thumbnail list in the second area 930 (operation S1130). The controller 170 may determine the size of the second area 930 based on the aspect ratio of the main image displayed in the first area 910.

If the display 180 is not pivoted (or rotated) to the longitudinal form 182, the method may further include pivoting (or rotating) the display 180 to the longitudinal form 182 so that the display 180 is positioned elongated vertically.

The number of thumbnail images in the thumbnail list may be determined based on the aspect ratio of the main image displayed in the first area 910. As shown in FIGS. 9 and 10, the area occupied by the thumbnail list (i.e., the number of the thumbnail images in the thumbnail list) may be controlled based on the aspect ratio of the main image.

The user may recognize thumbnail images corresponding to as many channels as possible during viewing a main image on the display 180 having the longitudinal form 182 and thus switch to an intended channel at a time without channel zapping.

Since the display 180 having the longitudinal form 182 is divided into a main image area and a thumbnail list area, the user may enjoy the main image without interruptions of the main image and the user may search for an intended channel by thumbnail images corresponding to available channels.

As shown in FIGS. 9 and 10, the second area 930 may be larger in size than the first area 910. If the aspect ratio of a main image wider than longer is maintained, the main image may be reduced in size on the display 180 having the longitudinal form 182 relative to the display 180 having the latitudinal form 181. The size of the second area 930 may be larger than the size of the first area 910 that displays the main image.

The thumbnail images of the thumbnail list may be displayed in a matrix having a plurality of rows and a plurality of columns, as shown in FIGS. 9 and 10. If the thumbnail images are displayed in two or more rows on the display 180 having the latitudinal form 191, the aspect ratio or size of the main image may be distorted. An increase in the number of rows may make the distortion severe.

More thumbnail images may be displayed in a matrix having a plurality of rows and a plurality of columns in a lower second area of a display having a longitudinal form that is divided into an upper first area and the lower second area.

The thumbnail images of the thumbnail list may be still images or moving pictures, and at least part of the thumbnail images may be updated.

A set-top box may be further provided to receive a broadcast signal, such as from a cable system (or a satellite system). Features described above, such as the channel browsing controller 170 and the controller 160, may be provided within the set-top box. The set-top box may transmit information to a display (or image display apparatus) to rotate the display from one position to another position. The set-top box may also receive information from the display (or image display apparatus) when the display is rotated from one position to another position.

The set-top box may provide a first number of thumbnail images when the display (or image display apparatus) is a second position or when the display (or image display apparatus) is rotated from the first position to the second position. The second number of thumbnail images may be different than the first number of thumbnail images.

The image display apparatus and the operation method therefor may not be restricted to the exemplary embodiments as set forth herein. Variations and combinations of exemplary embodiments as set forth herein may fall within the scope of the present invention.

The operation method of the image display apparatus may be implemented as a code that can be written on a computer-readable recording medium and can thus be read by a processor. The computer-readable recording medium may be any type of recording device in which data is stored in a computer-readable manner.

Examples of the computer-readable recording medium may include a ROM, a RAM, a CD-ROM, a magnetic tape, a floppy disc, an optical data storage, and/or a carrier wave (e.g., data transmission through the internet). The computer-readable recording medium may be distributed over a plurality of computer systems connected to a network so that computer-readable code is written thereto and executed therefrom in a decentralized manner. Functional programs, code, and code segments needed for realizing the embodiments herein may be construed by one of ordinary skill in the art.

According to one exemplary embodiment, a user may be allowed to intuitively identify contents of many broadcast channels without interruptions of an image being viewed by the user. Therefore, the user may be helped to select a channel easily, thus increasing user convenience.

Embodiments may provide an image display apparatus and an operation method therefor that allows a user to intuitively identify contents of video signals received on channels.

A method may be provided for operating an image display apparatus that is pivotable, including generating a plurality of thumbnail images based on an input signal, displaying a first thumbnail list including at least part of the generated thumbnail images, and displaying a second thumbnail list in place of the first thumbnail list, when the image display apparatus is pivoted. The first thumbnail list and the second thumbnail list include different numbers of thumbnail images.

A method may be provided for operating an image display apparatus that is pivotable, including dividing a screen of a display having a length larger than a width into a first area and a second area under the first area, displaying an image in the first area, and displaying a thumbnail list in the second area. A size of the second area may be determined according to an aspect ratio of the image displayed in the first area.

An image display apparatus may be provided that is pivotable, including a channel browsing processor for generating a plurality of thumbnail images based on an input signal, a display for displaying a first thumbnail list including at least part of the generated thumbnail images, and a controller for replacing the first thumbnail list with a second thumbnail list, when the image display apparatus is pivoted. The first thumbnail list and the second thumbnail list may include different numbers of thumbnail images or the first thumbnail list and the second thumbnail list may be displayed in areas of different sizes.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A displaying method of an image display apparatus, comprising:
   receiving a broadcast signal;
   displaying a first number of thumbnail images in a first area when the image display apparatus is in a first position, the thumbnail images being based on the received broadcast signal;
   displaying a first image in a second area other than the first area in which the first number of thumbnail images are displayed;
   rotating the image display apparatus from the first position to a second position;
   displaying a second number of thumbnail images in a third area when the image display apparatus is rotated to the second position; and
   displaying a second image rather than the first image in a fourth area other than the third area in which the second number of thumbnail images are displayed, when the image display apparatus is rotated from the first position to the second position,
   wherein the second number is different than the first number, the first image displayed in the second area has a same aspect ratio as the second image displayed in the fourth area, and the first image displayed in the second area has a different size than the second image displayed in the fourth area.

2. The method according to claim 1, wherein the image display apparatus in the first position has a width that is longer than a height, wherein the image display apparatus in the second position has a height that is longer than a width.

3. The method according to claim 1, wherein rotating the image display apparatus includes pivoting the image display apparatus.

4. The method, according to claim 1, wherein rotating the image display apparatus includes a user manually rotating the image display apparatus.

5. The method according to claim 1, wherein rotating the image display apparatus includes automatically rotating the image display apparatus based on a user input.

6. The method according to claim 1, further comprising when one of thumbnail images is selected, displaying an image corresponding to the selected thumbnail image.

7. The method according to claim 6, further comprising changing the second number of thumbnail images according to at least one of an aspect ratio or a size of the image corresponding to the selected thumbnail image.

8. The method according to claim 6, wherein the thumbnail image is selected by dragging the thumbnail image from the second number of thumbnail images and dropping the dragged thumbnail image outside an area of the second number of thumbnail images.

9. The method according to claim 1, further comprising:
   updating at least one of the second number of thumbnail images; and
   displaying the updated thumbnail image.

10. An image display apparatus, comprising:
    a device to receive a broadcast signal;
    a channel browsing processor to provide thumbnail images based on the received broadcast signal;
    a display to display a first number of thumbnail images in a first area and to display a first image in a second area other than the first area in which the first number of thumbnail images are displayed when the image display apparatus is in a first position, and the display to display a second number of thumbnail images in a third area and to display a second image in place of the first image in a fourth area other than the third area in which the second number of thumbnail images are displayed when the image display apparatus is rotated from the first position to the second position; and
    a controller to control the display to replace the first number of thumbnail images displayed on the display with the second number of thumbnail images when the image display apparatus is rotated from the first position to the second position,
    wherein the second number is different than the first number, the first image displayed in the second area has a same aspect ratio as the second image displayed in the fourth area, and the first image displayed in the second area has a different size than the second image displayed in the fourth area.

11. The image display apparatus according to claim 10, wherein the image display apparatus in the first position has a width that is longer than a height, wherein the image display apparatus in the second position has a height that is longer than a width.

12. The image display apparatus according to claim 10, wherein the image display apparatus is rotated by a user rotating the image display apparatus.

13. The image display apparatus according to claim 10, wherein the image display apparatus is rotated by automatically rotating the image display apparatus based on a user input.

14. The image display apparatus according to claim 10, wherein the display displays an image corresponding to a selected thumbnail image when one of thumbnail images is selected.

15. A method of providing thumbnail images, comprising:
receiving a broadcast signal;
providing a first number of thumbnail images and a first image when an image display apparatus is in a first position, the thumbnail images being based on the received broadcast signal; and
providing a second number of thumbnail images and a second image when an image display apparatus is rotated from the first position to the second position,
wherein the second number is different than the first number, the first image has a same aspect ratio as the second image, and the first image has a different size than the second image.

16. The method according to claim 15, further comprising determining a rotation of the image display apparatus from the first position to a second position.

17. The method according to claim 15, wherein the broadcast signal is received by a set top box, and the set top box provides the thumbnail images.

\* \* \* \* \*